(12) United States Patent
Purcell

(10) Patent No.: US 12,508,862 B2
(45) Date of Patent: Dec. 30, 2025

(54) OFF-ROAD VEHICLE HAVING AN ACTIVELY ADJUSTABLE SUSPENSION

(71) Applicant: Arctic Cat Inc., Thief River Falls, MN (US)

(72) Inventor: Lucas Grant Purcell, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 384 days.

(21) Appl. No.: 18/120,279

(22) Filed: Mar. 10, 2023

(65) Prior Publication Data

US 2024/0300276 A1 Sep. 12, 2024

(51) Int. Cl.
*B60G 17/08* (2006.01)
(52) U.S. Cl.
CPC .......... *B60G 17/08* (2013.01); *B60G 2202/24* (2013.01); *B60G 2300/07* (2013.01); *B60G 2500/10* (2013.01)
(58) Field of Classification Search
None
See application file for complete search history.

(56) References Cited

U.S. PATENT DOCUMENTS

| | | | |
|---|---|---|---|
| 9,239,090 B2 * | 1/2016 | Marking | B60G 17/08 |
| 9,776,481 B2 | 10/2017 | Deckard et al. | |
| 10,933,710 B2 * | 3/2021 | Tong | B60G 17/01908 |
| 11,021,031 B2 | 6/2021 | Steinmetz et al. | |
| 2015/0259011 A1 * | 9/2015 | Deckard | B60N 2/24 |
| | | | 280/781 |
| 2021/0300472 A1 | 9/2021 | Thomas et al. | |
| 2022/0016949 A1 * | 1/2022 | Graus | B60G 17/08 |
| 2022/0163088 A1 | 5/2022 | Gagnon | |
| 2022/0242190 A1 * | 8/2022 | Stanford | H04B 5/26 |
| 2022/0288990 A1 | 9/2022 | Smith | |
| 2022/0403909 A1 * | 12/2022 | Laird | F16F 9/3488 |
| 2024/0300276 A1 * | 9/2024 | Purcell | B60G 17/08 |

* cited by examiner

*Primary Examiner* — Devon C Kramer
(74) *Attorney, Agent, or Firm* — Lawrence Youst PLLC

(57) ABSTRACT

An off-road vehicle includes a frame assembly, a powertrain, a seat assembly, a plurality of wheels and a rear suspension including first and second shock absorbers that respectively couple first and second rear wheels to the frame assembly. A first remote auxiliary reservoir is in fluid communication with the first shock absorber and has a manual control configured to adjust a damping function of the first shock absorber. A second remote auxiliary reservoir is in fluid communication with the second shock absorber and has a manual control configured to adjust a damping function of the second shock absorber. The manual controls of the remote auxiliary reservoirs are accessible by an occupant of the vehicle, thereby enabling active adjustments to the damping function of the rear suspension.

20 Claims, 8 Drawing Sheets

OFF-ROAD VEHICLE HAVING AN ACTIVELY ADJUSTABLE SUSPENSION

TECHNICAL FIELD OF THE DISCLOSURE

The present disclosure relates, in general, to off-road vehicles that have shock absorbers with an adjustable damping function and, in particular, to off-road vehicles that have an actively adjustable rear suspension that includes remote auxiliary reservoirs that are accessible by an occupant of the vehicle to manually adjust the damping function of the rear shock absorbers.

BACKGROUND

Off-road vehicles are popular land vehicles used to transport persons, cargo and accessories. Such off-road vehicles include all-terrain vehicles (ATV), light utility vehicles (LUV), side-by-side vehicles (SxS), utility-terrain vehicles (UTV), recreational off-highway vehicles (ROV) and multipurpose off-highway utility vehicles (MOHUV), to name a few. Certain off-road vehicles are primarily designed for utility applications and may offer high ground clearance, low gear ratios for towing, racks for hauling large loads, large dump boxes and/or high payload capacity. Other off-road vehicles are primarily designed for recreational applications and may offer high performance engines as well as safety features including rollover protection, hard tops, windshields and/or cab enclosure features such as body panels that restrict occupant egress in the event of a rollover. Off-road vehicles typically have gasoline powered engines, four wheels and are capable to carrying two to four people. While some off-road vehicles have handlebar steering and motorcycle-style seating, many off-road vehicles utilize automobile-style controls such as a steering wheel and foot pedals, and have side-by-side seating for the occupants. Off-road vehicles commonly have front and/or rear suspensions including shock absorbers that damp vibrations and reduce the rocking and swaying experience by the occupants making such off-road vehicles suitable for travel over a diversity of terrains, in various conditions and at an array of speeds.

SUMMARY

In a first aspect, the present disclosure is directed to an off-road vehicle including a frame assembly, a seat assembly coupled to the frame assembly, a powertrain coupled to the frame assembly and a plurality of wheels with at least one of the wheels operatively coupled to the powertrain and wherein the plurality of wheels includes first and second rear wheels. A rear suspension includes first and second shock absorbers with the first shock absorber coupling the first rear wheel to the frame assembly and the second shock absorber coupling the second rear wheel to the frame assembly. A first remote auxiliary reservoir is in fluid communication with the first shock absorber and has a manual control configured to adjust a damping function of the first shock absorber. A second remote auxiliary reservoir is in fluid communication with the second shock absorber and has a manual control configured to adjust a damping function of the second shock absorber. The manual controls of the first and second remote auxiliary reservoirs are configured to be accessible by an occupant of the vehicle.

In certain embodiments, the seat assembly may include first and second seats and the manual controls of the first and second remote auxiliary reservoirs may be positioned between the first and second seats. In such embodiments, the first and second seats may each be a bucket seat. Also, in such embodiments, the first seat may be a driver seat and the second seat may be a passenger seat. In some embodiments, each of the first and second seats may include a seat bottom, a seatback and a headrest. In such embodiments, the manual controls of the first and second remote auxiliary reservoirs may be positioned between the seat bottoms of the first and second seats, between the seatbacks of the first and second seats or between the headrests of the first and second seats. In certain embodiments, the frame assembly may include an upper rail and the first and second remote auxiliary reservoirs may be coupled to the upper rail. In some embodiments, the first and second remote auxiliary reservoirs may be positioned in a side-by-side orientation.

In certain embodiments, a cargo box may be coupled to the frame assembly aft of the seat assembly such that the first and second remote auxiliary reservoirs may be positioned at least partially between the seat assembly and the cargo box. In such embodiments, the first and second remote auxiliary reservoirs may be positioned aft of the seat assembly, at least partially forward of the cargo box, above the powertrain and/or above the cargo box. In some embodiments, the frame assembly may define an occupant space and the manual controls of the first and second remote auxiliary reservoirs may be positioned proximate the occupant space or may be positioned within the occupant space. In certain embodiments, the manual controls of the first and second remote auxiliary reservoirs may be accessible by the occupant of the vehicle while the vehicle is moving, thereby enabling active adjustments to the damping function of the rear suspension. In some embodiments, the off-road vehicle may be a side-by-side vehicle.

In a second aspect, the present disclosure is directed to an off-road vehicle including a frame assembly, a powertrain coupled to the frame assembly and a plurality of wheels with at least one of the wheels operatively coupled to the powertrain and wherein the plurality of wheels includes first and second rear wheels. A rear suspension includes first and second shock absorbers with the first shock absorber coupling the first rear wheel to the frame assembly and the second shock absorber coupling the second rear wheel to the frame assembly. A seat assembly is coupled to the frame assembly with the seat assembly having first and second seats in a side-by-side arrangement. A cargo box is coupled to the frame assembly and is positioned aft of the seat assembly. A first remote auxiliary reservoir is in fluid communication with the first shock absorber and has a manual control configured to adjust a damping function of the first shock absorber. A second remote auxiliary reservoir is in fluid communication with the second shock absorber and has a manual control configured to adjust a damping function of the second shock absorber. The first and second remote auxiliary reservoirs are positioned at least partially between the seat assembly and the cargo box with the manual controls of the first and second remote auxiliary reservoirs positioned between the first and second seats such that the manual controls of the first and second remote auxiliary reservoirs are accessible by an occupant of the vehicle, thereby enabling active adjustments to the damping function of the rear suspension.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1A:
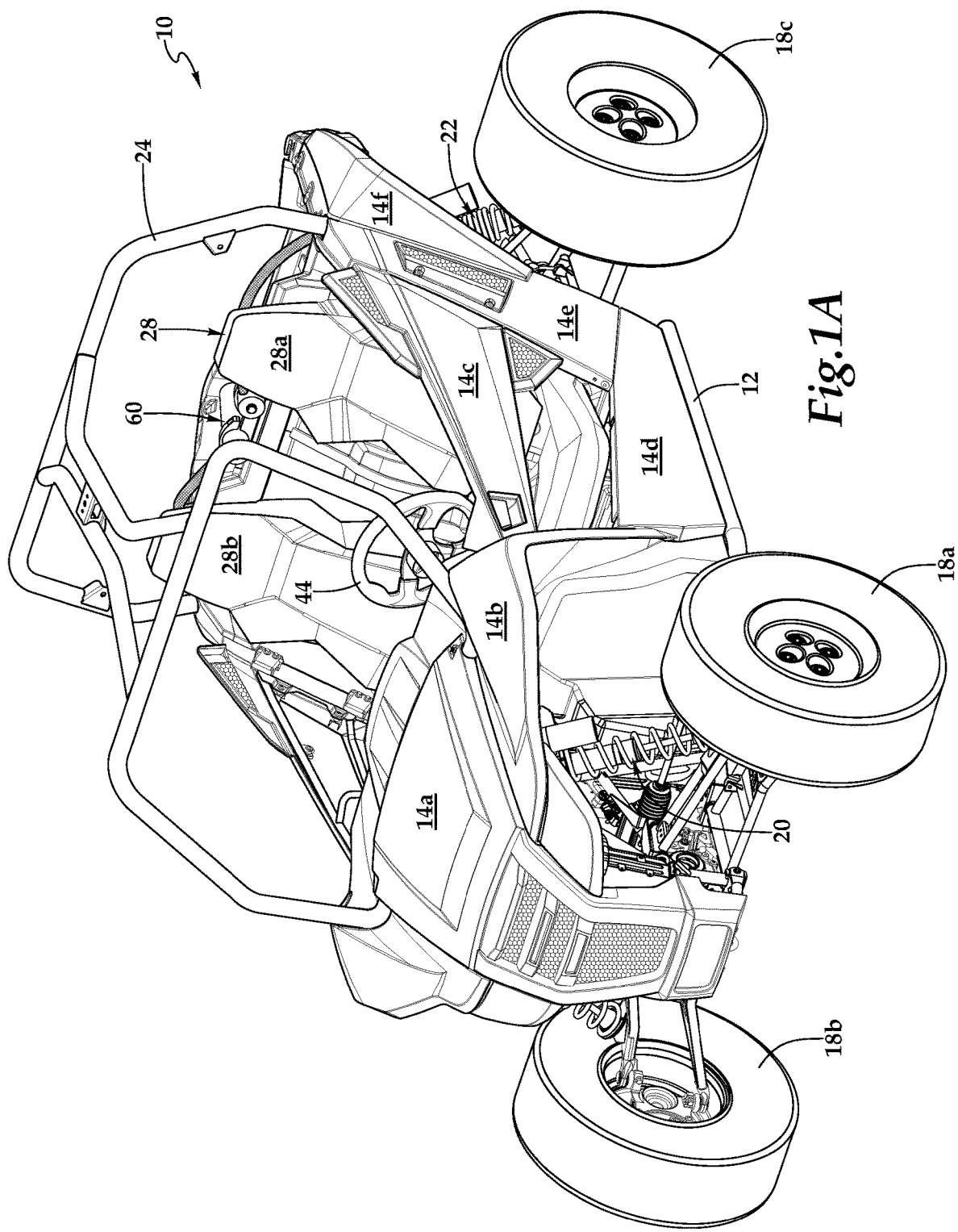
FIGS. 1A-1D are schematic illustrations of an off-road vehicle having an actively adjustable rear suspension in accordance with embodiments of the present disclosure.
Figure 1B:
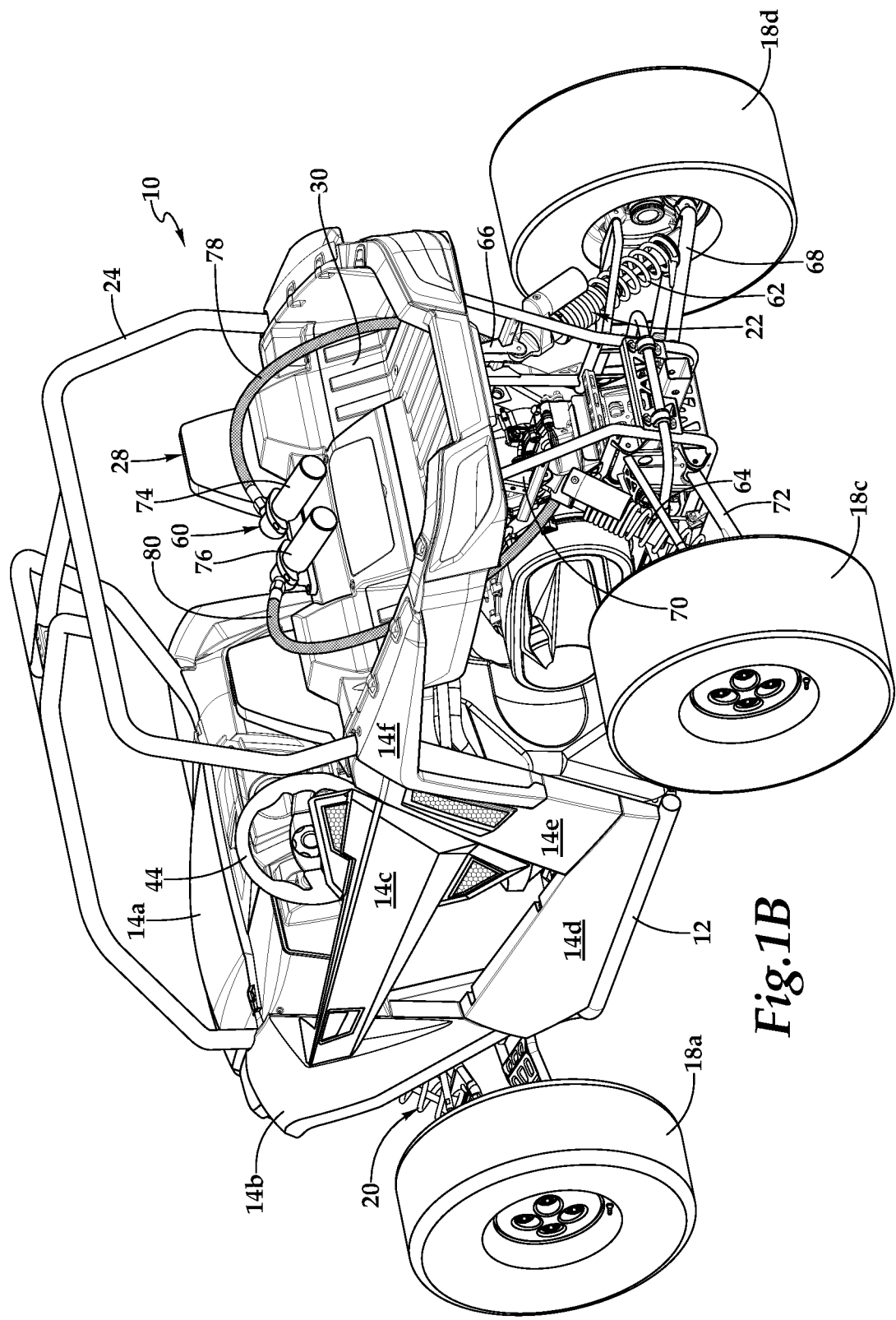
Figure 1C:
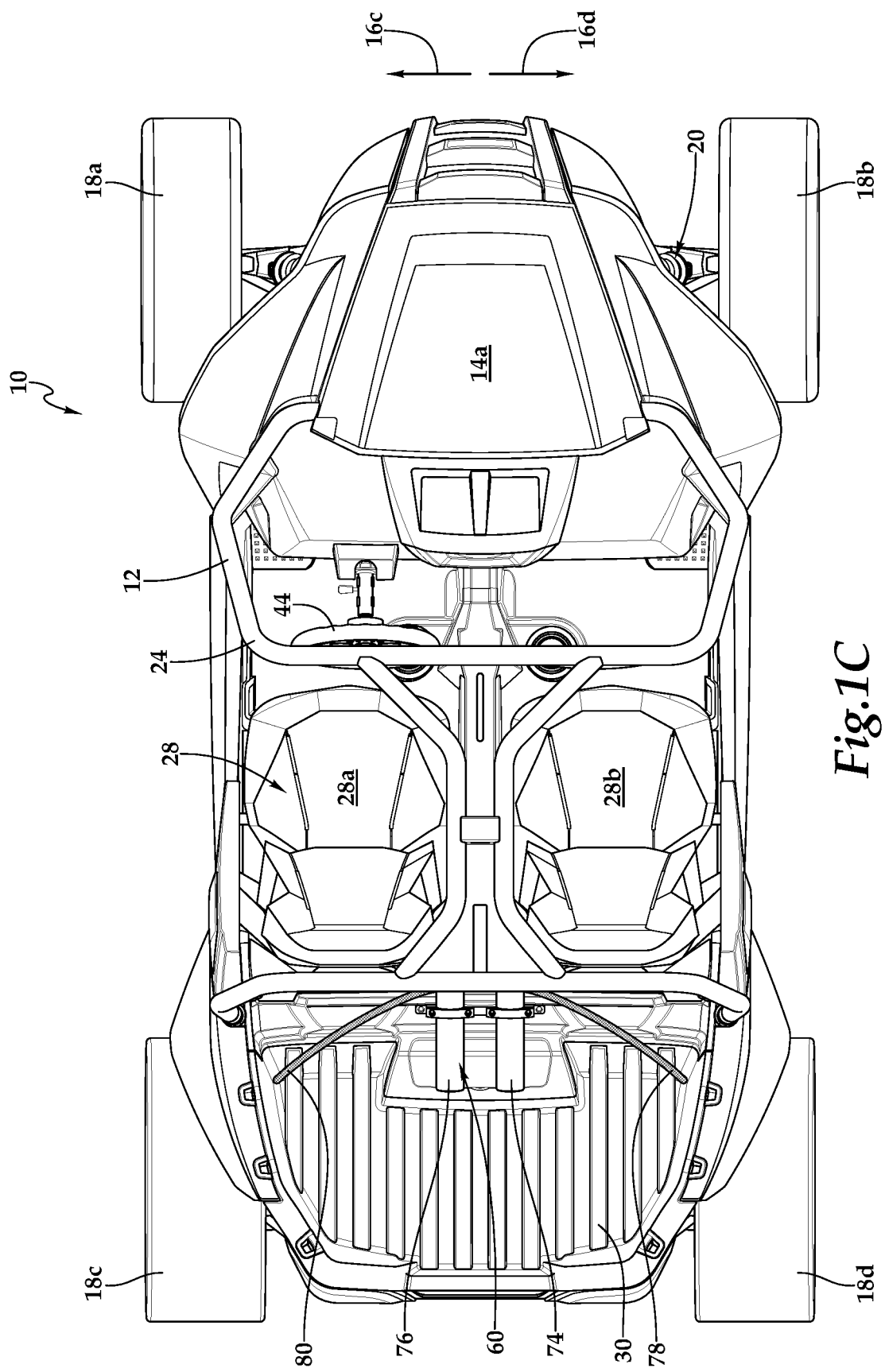

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1D in the drawings, a land vehicle depicted as an off-road vehicle having an actively adjustable rear suspension is schematically illustrated and generally designated 10. In the illustrated embodiment, off-road vehicle 10 is a side-by-side vehicle. In other embodiments, off-road vehicle 10 may be an all-terrain vehicle, a light utility vehicle, a utility-terrain vehicle, a recreational off-highway vehicle, a multipurpose off-highway utility vehicle or the like. Structural support for off-road vehicle 10 is provided by frame assembly 12, on or around which the various components of off-road vehicle 10 are assembled. Frame assembly 12 is formed of a plurality of structural members that are interconnected by welds, bolts, pins, adhesive and/or other suitable fastening means. The structural members may include tubular members, such as round and hollow tubular members, comprised of metal or metal alloy, such as steel or aluminum. Alternatively or additionally, certain structural members may be formed from polymeric materials such as a fiber reinforced polymer composite.

Off-road vehicle 10 includes a plurality of body panels that cover and protect certain components of off-road vehicle 10 such as hood panel 14a, left front fender panel 14b, left door panel 14c, left lower panel 14d, left rear panel 14e and left rear fender panel 14f. It should be understood by those having ordinary skill in the art that off-road vehicle 10 has similar body panels on the right side of the vehicle with the body panels of off-road vehicle 10 being collectively referred to herein as body panels 14. Body panels 14 may be formed from sheet metal or metal alloy, such as steel or aluminum, and/or polymeric materials such as fiber reinforced polymer composites. In addition, it should be understood by those having ordinary skill in the art that the right side and the left side of off-road vehicle 10 will be with reference to a forward-facing occupant of off-road vehicle 10 with the right side of off-road vehicle 10 corresponding to the right side of the occupant and the left side of off-road vehicle 10 corresponding to the left side of the occupant. The forward direction of off-road vehicle 10 is indicated by forward arrow 16a and the backward direction of off-road vehicle 10 is indicated by backwards arrow 16b in FIG. 1D. The forward and backward directions also represent the longitudinal direction of off-road vehicle 10 with the lateral direction of off-road vehicle 10 being normal thereto and represented by a leftward arrow 16c and a rightward arrow 16d in FIG. 1C. The backward direction may also be referred to herein as the aftward direction.

Figure 1D:
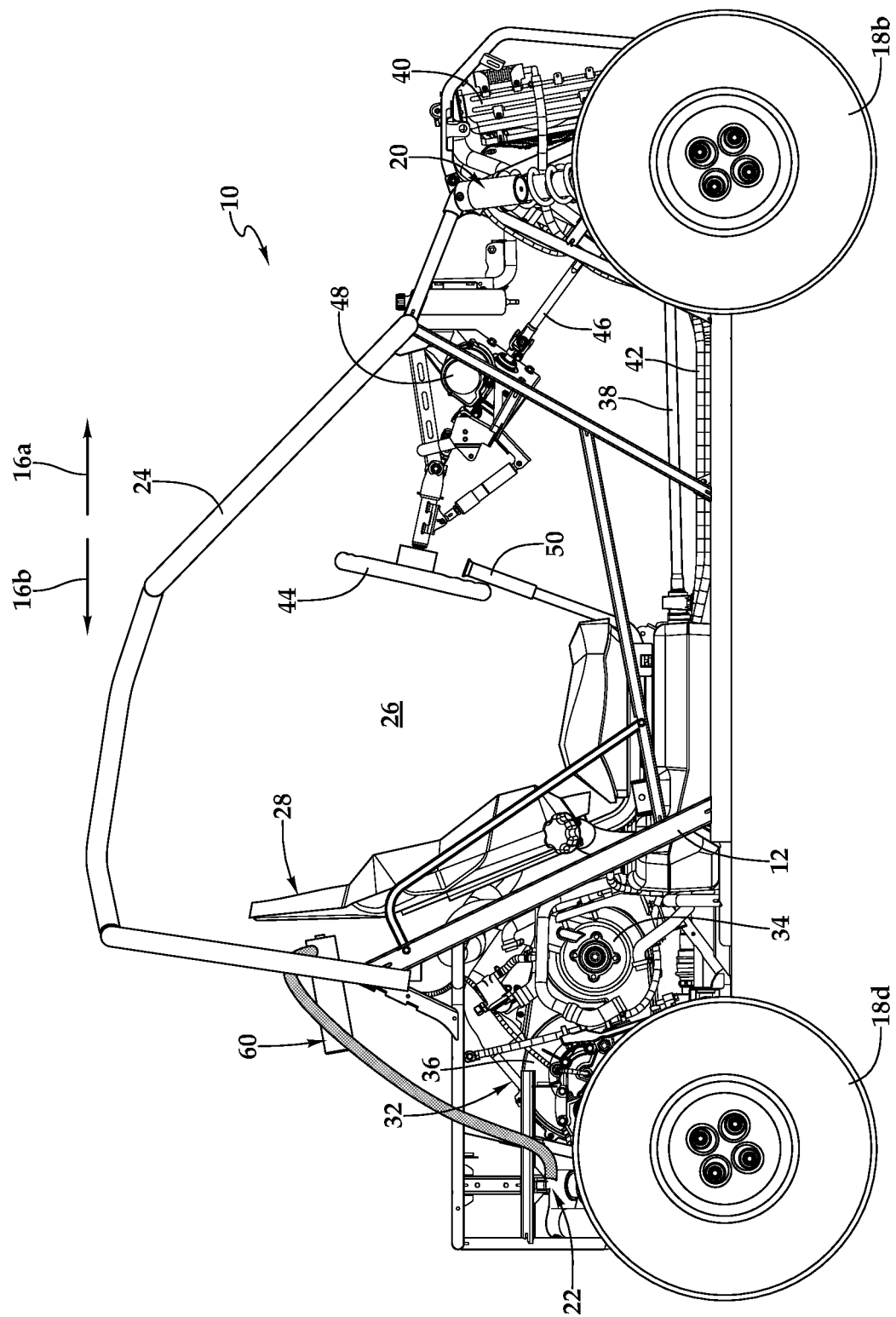

Off-road vehicle 10 includes a plurality of ground engaging members depicted as four wheels 18 including front wheels 18a, 18b that are coupled to frame assembly 12 by a front suspension 20 and rear wheels 18c, 18d that are coupled to frame assembly 12 by an actively adjustable rear suspension 22. Frame assembly 12 includes a rollover protection structure 24 that at least partially defines an occupant space 26 within off-road vehicle 10, as best seen in FIG. 1D. In the illustrated embodiment, occupant space 26 includes a seating assembly 28 depicted as a pair of bucket seats; namely, a driver seat 28a and a passenger seat 28b in a side-by-side arrangement. In other embodiments, the occupant space of an off-road vehicle may have a bench seating arrangement. In still other embodiments, the occupant space of an off-road vehicle may have front and rear seats to accommodate additional occupants such as a total of four, six or more occupants. Positioned aft of seating assembly 28, off-road vehicle 10 includes a cargo box 30 for transporting equipment, supplies, provisions or other desired items.

In FIG. 1D, body panels 14 have been removed from off-road vehicle 10 to better reveal certain additional components of off-road vehicle 10. For example, off-road vehicle 10 has a powertrain 32 that includes an engine 34 and a transmission 36, both of which are coupled to frame assembly 12. Engine 34 may be any type of engine such as a four-stroke engine, an electric motor or other prime mover. Engine 34 may be naturally aspirated or include a power adder such as a supercharger or a turbocharger. Transmission 36 may be a continuously variable transmission, an electrically variable transmission or other suitable transmission type for varying the ratio of the engine output speed to the input speed to wheels 18. In the illustrated embodiment, off-road vehicle 10 is a four-wheel drive vehicle in which powertrain 32 is operatively coupled to front wheels 18a, 18b via a front differential and to rear wheels 18c, 18d via a rear differential which is coupled to the front differential via a drive shaft 38. In other embodiments, off-road vehicle 10 may be a two-wheel drive vehicle such as a rear-wheel drive vehicle in which the powertrain is coupled to only the rear wheels or a front-wheel drive vehicle in which the powertrain is coupled to only the front wheels. Off-road vehicle 10 includes a radiator 40 that is coupled to engine 34 via coolant lines 42. Radiator 40 is part of the engine cooling system providing heat exchanger functionality to cool a circulating fluid that is sent through engine 34 to absorb heat, thereby preventing engine overheating.

Positioned within occupant space 26, off-road vehicle 10 includes a steering wheel 44 that is coupled to front wheels 18a, 18b via a steering linkage 46. In the illustrated embodiment, off-road vehicle 10 includes an electric power steering system 48 that is coupled to steering linkage 46. In other embodiments, off-road vehicle 10 may have hydraulically assisted power steering, electric power steering without a mechanical linkage such as a drive-by-wire system, electric assisted power steering or other suitable steering system. Also disposed within occupant space 26, off-road vehicle 10 includes a gear shift selector 50 that is coupled to transmission 36 and enables the driver to shift off-road vehicle 10 between various diving modes including forward and reverse driving modes.

Off-road vehicles are designed to travel over a diversity of terrains, in various conditions and at an array of speeds. Accordingly, many off-road vehicles have a front suspension including front shock absorbers and a rear suspension including rear shock absorbers that dampen vibrations and reduce the rocking and swaying experience by the occupants of the off-road vehicle, thereby increasing comfort. Due to the wide variety of uses for off-road vehicles and the varying comfort levels desired by the occupants of off-road vehicles, some high performance shock absorber systems used in off-road vehicles have separate reservoirs that provide adjustable damping functionality enabling different ride qualities ranging from soft to stiff and a plurality of damping levels therebetween. It has been found, however, that some high performance shock absorber systems require that the vehicle be stopped to allow the operator to exit the vehicle and access manual controls on each of the auxiliary reservoirs, which are typically located proximate the shock absorbers and/or on an underside of the vehicle, to adjust the damping function to the desired level. Other high performance shock absorber systems incorporate electronic actuators that may be controlled from the vehicle's instrument panel, but these systems can be cost prohibitive. To overcome these deficiencies of current off-road vehicles, in the embodiments disclosed herein, off-road vehicle 10 includes a rear shock absorber system including remote auxiliary reservoirs having manual controls that are positioned proximate to and/or within the occupant space 26, such that the manual controls of the remote auxiliary reservoirs are accessible by an occupant of off-road vehicle 10 while the vehicle is moving, thereby enabling active adjustments to the damping function of the rear suspension.

Figure 2:
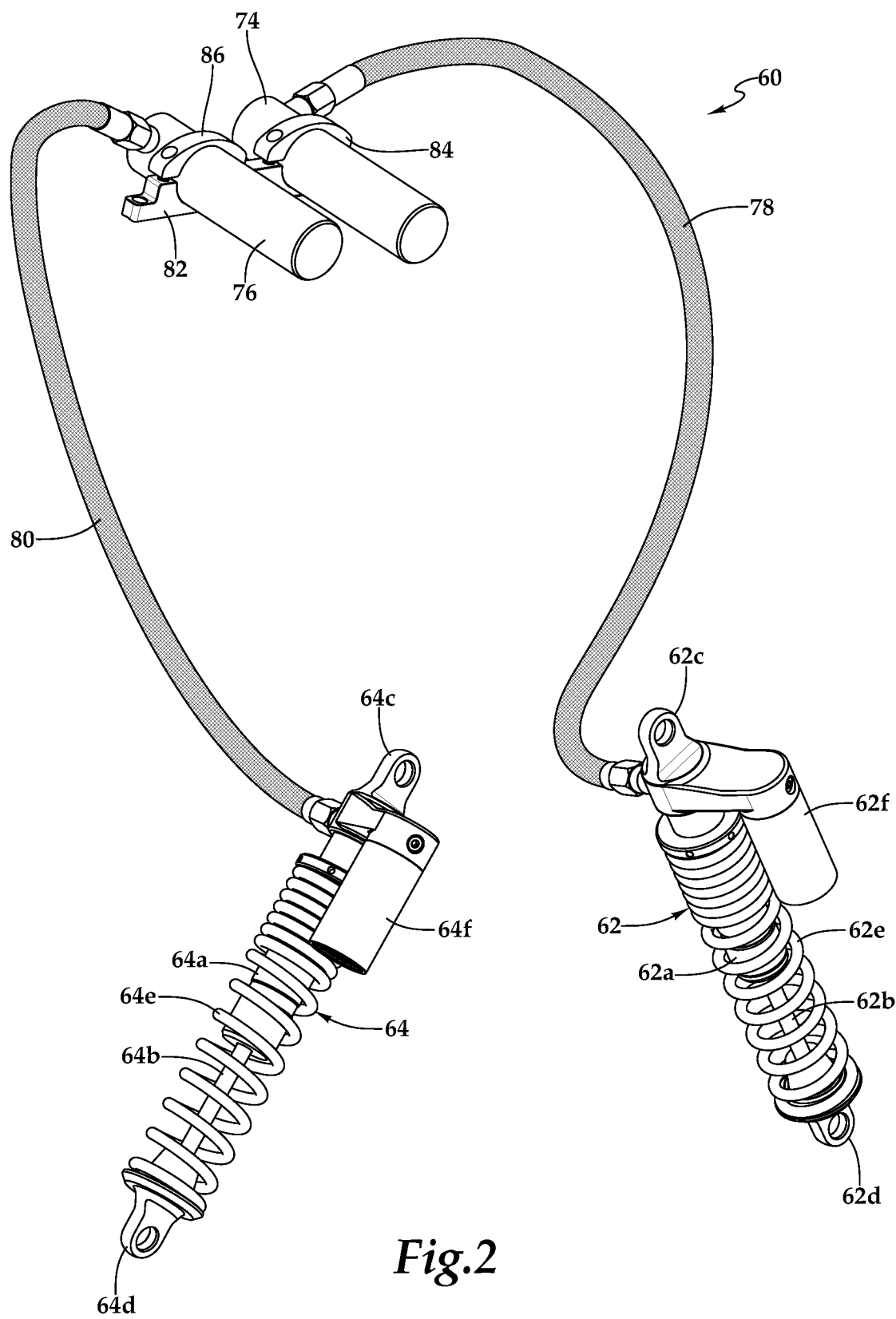
FIG. 2 is a schematic illustration of a shock absorber system for an off-road vehicle having an actively adjustable rear suspension in accordance with embodiments of the present disclosure.

Referring additionally to FIG. 2 in the drawings, off-road vehicle 10 includes a rear shock absorber system 60 that enables active adjustments to the damping function of rear suspension 22 of off-road vehicle 10. Rear shock absorber system 60 includes a right rear strut depicted as right shock absorber 62 and a left rear strut depicted as left shock absorber 64. Right shock absorber 62 includes a cylinder 62a with a piston 62b partially disposed therein that is movable between extended and retracted positions responsive to forces applied thereto via wheel 18d and the damping function thereof. Right shock absorber 62 includes an upper lug 62c that is coupled to frame assembly 12 of off-road vehicle 10 at a bracket 66 via a suitable bearing assembly. Right shock absorber 62 also includes a lower lug 62d that is coupled to wheel 18d at a lower support arm 68 via a suitable bearing assembly. Right shock absorber 62 has a coil spring 62e that provides suspension functionality for off-road vehicle 10. Right shock absorber 62 also has a locally mounted exterior fluid reservoir 62f. Likewise, left shock absorber 64 includes a cylinder 64a with a piston 64b partially disposed therein that is movable between extended and retracted positions responsive to forces applied thereto via wheel 18c and the damping function thereof. Left shock absorber 64 includes an upper lug 64c that is coupled to frame assembly 12 of off-road vehicle 10 at a bracket 70 via a suitable bearing assembly. Left shock absorber 64 also includes a lower lug 64d that is coupled to wheel 18c at a lower support arm 72 via a suitable bearing assembly. Left shock absorber 64 has a coil spring 64e that provides suspension functionality for off-road vehicle 10. Left shock absorber 64 also has a locally mounted exterior fluid reservoir 64f.

Figure 3A:
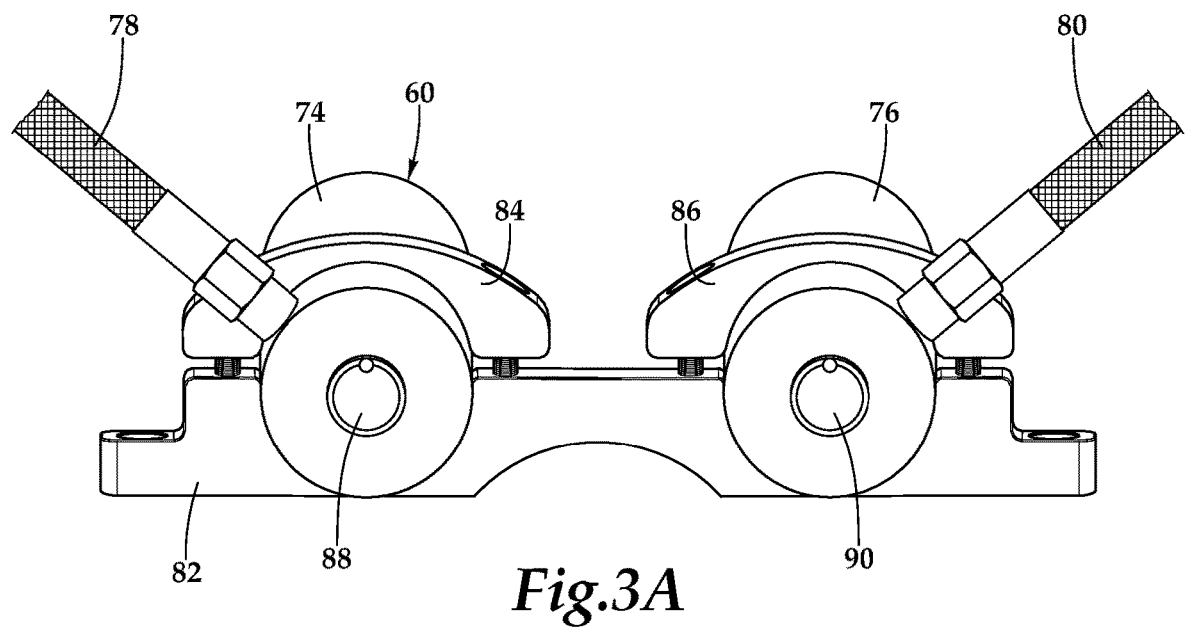
FIGS. 3A-3B are front views of remote auxiliary reservoirs of a shock absorber system for an off-road vehicle having an actively adjustable rear suspension in accordance with embodiments of the present disclosure depicting the remote auxiliary reservoirs in different damping settings.
Figure 3B:
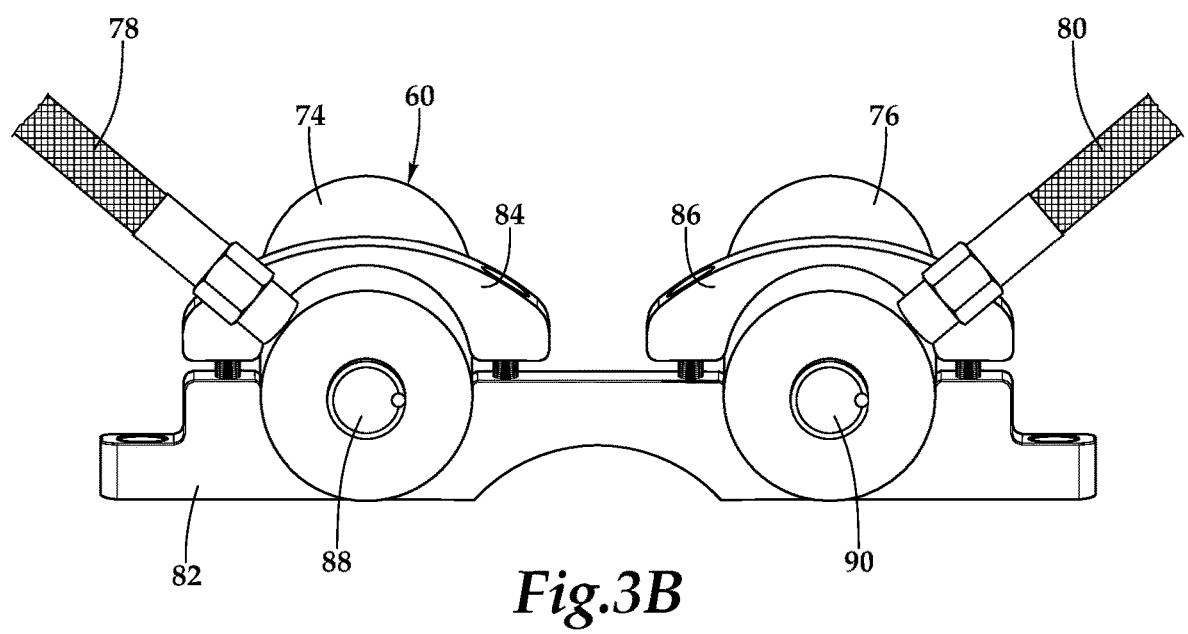

Rear shock absorber system 60 includes a right remote auxiliary reservoir 74 and a left remote auxiliary reservoir 76. Right remote auxiliary reservoir 74 is fluidically coupled to right shock absorber 62 via a fluid conduit 78 such as a rubber hose or braided cable. Likewise, left remote auxiliary reservoir 76 is fluidically coupled to left shock absorber 64 via a fluid conduit 80. In the illustrated embodiment, each of right remote auxiliary reservoir 74 and left remote auxiliary reservoir 76 is positioned within a bracket 82 and respectively secured thereto with clamps 84, 86. Referring additionally to FIGS. 3A-3B in the drawings, right remote auxiliary reservoir 74 includes a manual control 88 that is rotatable between a plurality of positions to adjust the damping function of right shock absorber 62 between, for example, soft and stiff as well as a plurality of damping levels therebetween as illustrated by the difference in the positions of manual control 88 in FIGS. 3A and 3B. Likewise, left remote auxiliary reservoir 76 includes a manual control 90 that is rotatable between a plurality of positions to adjust the damping function of left shock absorber 64 between, for example, soft and stiff as well as a plurality of damping levels therebetween as illustrated by the difference in the positions of manual control 90 in FIGS. 3A and 3B.

Referring now to FIGS. 4A-4D in the drawings, various embodiments of an off-road vehicle having an actively adjustable rear suspension will be discussed. As illustrated, seating assembly 28 includes driver seat 28a and passenger seat 28b. Driver seat 28a has a headrest 92, a seatback 94 and a seat bottom 96. Likewise, passenger seat 28b has a headrest 98, a seatback 100 and a seat bottom 102. Driver seat 28a and passenger seat 28b are positioned within occupant space 26 that also includes items such as steering wheel 44 and gear shift selector 50 such that these controls are accessible by an occupant of the vehicle, such as a driver, while the vehicle is moving. As discussed herein, to overcome certain deficiencies of current off-road vehicles wherein access to the manual controls for adjusting the damping function of the rear suspension is limited, in the embodiments disclosed herein, off-road vehicle 10 includes remote auxiliary reservoirs 74, 76 having manual controls 88, 90 that are positioned proximate to and/or within the occupant space 26 such that manual controls 88, 90 are accessible by an occupant of off-road vehicle 10 to enable active adjustments to the damping function of shock absorbers 62, 64.

Figure 4A:
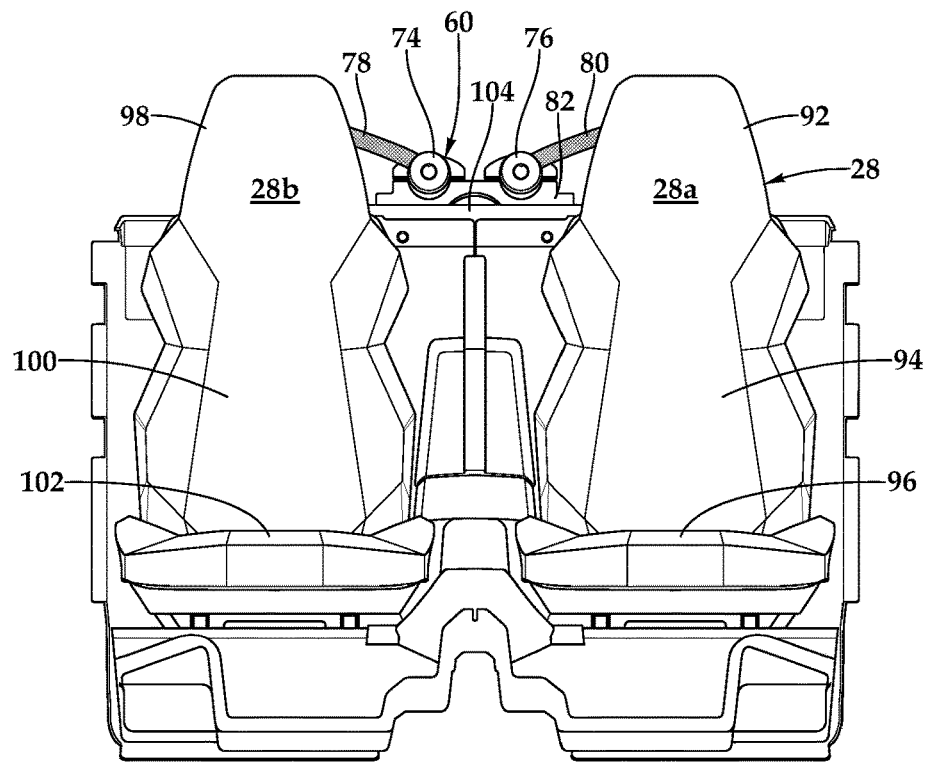
FIGS. 4A-4D are front views of a seating assembly for an off-road vehicle having an actively adjustable rear suspension in accordance with embodiments of the present disclosure depicting the remote auxiliary reservoirs in various locations.
Figure 4B:
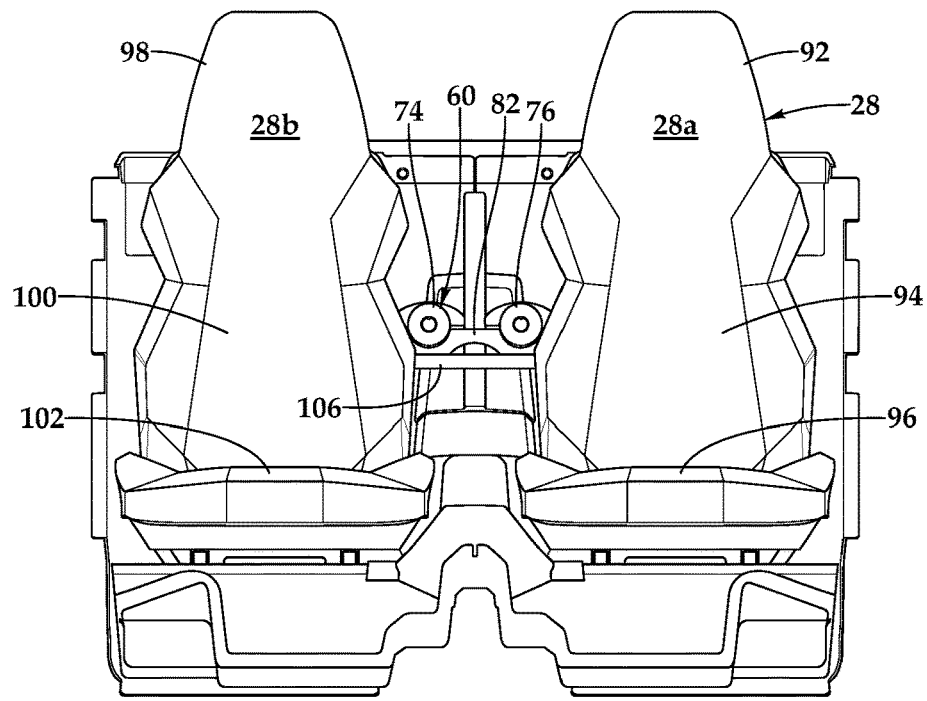
Figure 4C:
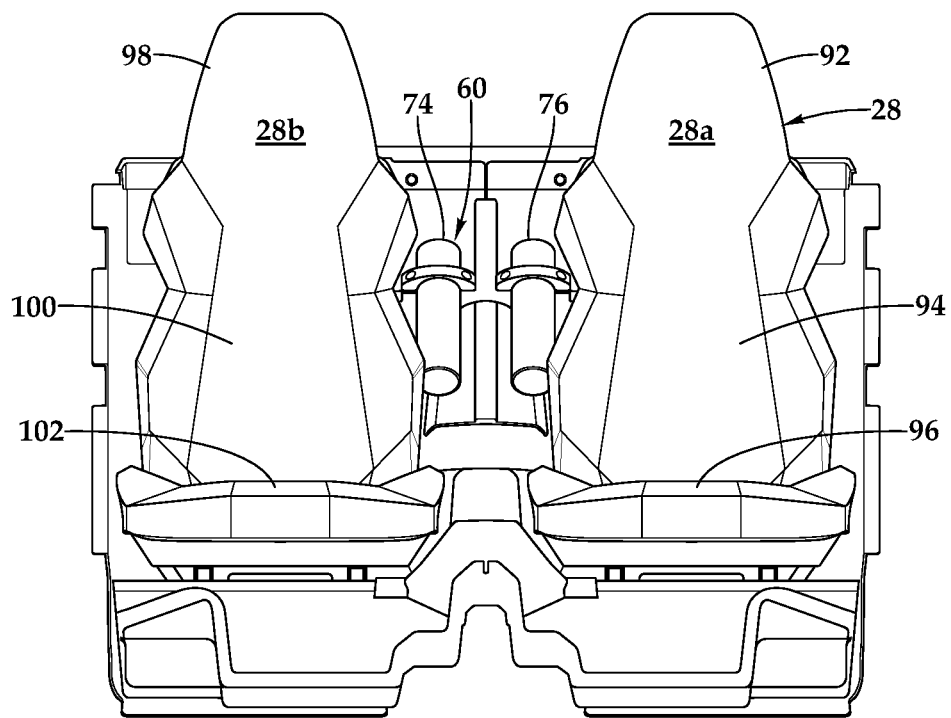
Figure 4D:
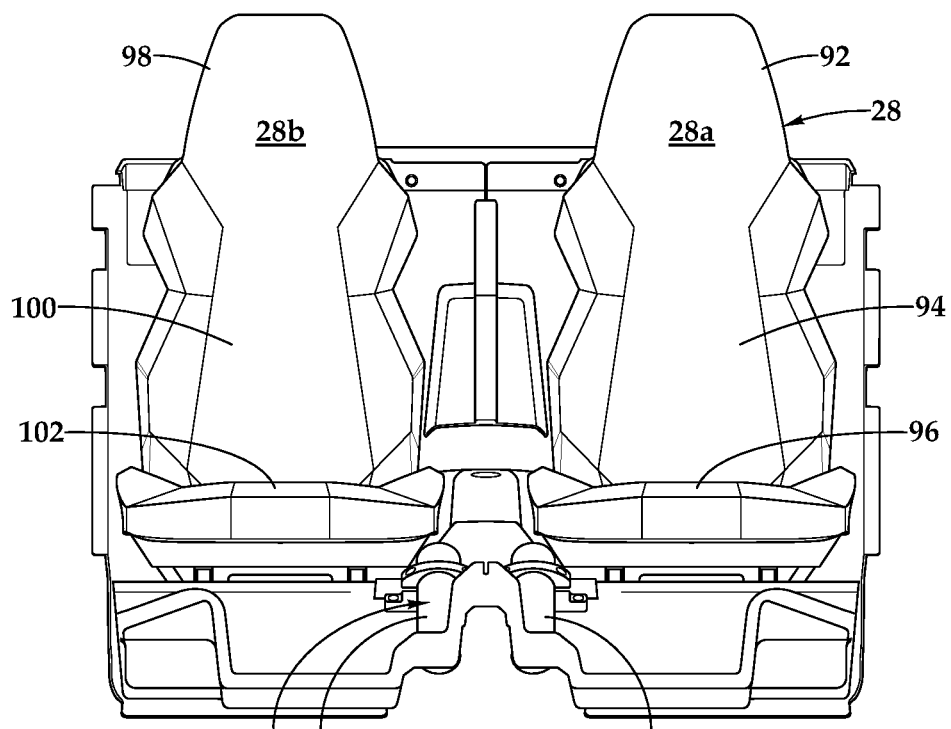

For example, in FIG. 4A, remote auxiliary reservoirs 74, 76 are coupled to frame assembly 12 at a laterally extending upper rail 104 disposed aft of seat assembly 28. In other embodiments, the upper rail that supports remote auxiliary reservoirs 74, 76 may be a component of a seat assembly such as in off-road vehicles having a bench seating arrangement. In the illustrated embodiment, bracket 82 is coupled to upper rail 104 using screws, bolts or other suitable coupling means. Remote auxiliary reservoirs 74, 76 are secured within bracket 82 using clamps 84, 86, respectively, that are coupled to bracket 82 using screws, bolts or other suitable coupling means. Remote auxiliary reservoirs 74, 76 are generally horizontally oriented in a side-by-side arrangement such that manual controls 88, 90 are positioned between driver seat 28a and passenger seat 28b and more specifically, between headrest 92 of driver seat 28a and headrest 98 of passenger seat 28b. In the longitudinal direction of off-road vehicle 10, remote auxiliary reservoirs 74, 76 are positioned at least partially between seat assembly 28 and cargo box 30. For example, remote auxiliary reservoirs 74, 76 may be positioned aft of seat assembly 28 and at least partially forward of cargo box 30. Vertically, remote auxiliary reservoirs 74, 76 are positioned above powertrain 32, above cargo box 30, above seatbacks 94, 100 and above seat bottoms 96, 102. In this configuration, with manual controls 88, 90 in a forward facing orientation, manual controls 88, 90 of remote auxiliary reservoirs 74, 76 are positioned within occupant space 26 such that manual controls 88, 90 are accessible by an occupant of off-road vehicle 10 enabling active adjustments to the damping function of shock absorbers 62, 64.

Even though remote auxiliary reservoirs 74, 76 have been described and depicted as being coupled to upper rail 104 and positioned between headrest 92 of driver seat 28a and headrest 98 of passenger seat 28b, it should be understood by those having ordinary skill in the art that remote auxiliary reservoirs 74, 76 could be positioned in other locations such that manual controls 88, 90 are accessible from occupant space 26. For example, in FIG. 4B, bracket 82 is coupled to a central rail 106 using screws, bolts or other suitable coupling means. Remote auxiliary reservoirs 74, 76 are secured within bracket 82 using clamps 84, 86, respectively, that are coupled to bracket 82 using screws, bolts or other suitable coupling means. Remote auxiliary reservoirs 74, 76 are generally horizontally oriented in a side-by-side arrangement such that manual controls 88, 90 are positioned between driver seat 28a and passenger seat 28b and more specifically, between seatback 94 of driver seat 28a and seatback 100 of passenger seat 28b. In the longitudinal direction of off-road vehicle 10, remote auxiliary reservoirs 74, 76 are positioned at least partially between seat assembly 28 and cargo box 30. For example, remote auxiliary reservoirs 74, 76 may be positioned at least partially aft of seat assembly 28 and forward of cargo box 30. Vertically, remote auxiliary reservoirs 74, 76 are positioned at least partially above powertrain 32, above seat bottoms 96, 102 and below headrests 92, 98. In this configuration, with manual controls 88, 90 in a forward facing orientation, manual controls 88, 90 of remote auxiliary reservoirs 74, 76 are positioned within occupant space 26 such that manual controls 88, 90 are accessible by an occupant of off-road vehicle 10 enabling active adjustments to the damping function of shock absorbers 62, 64.

Even though remote auxiliary reservoirs 74, 76 have been described and depicted as being generally horizontally oriented with manual controls 88, 90 in a forward facing orientation, it should be understood by those having ordinary skill in the art that remote auxiliary reservoirs 74, 76 could be positioned in other orientations while still maintaining manual controls 88, 90 in an occupant accessible location. For example, in FIG. 4C, remote auxiliary reservoirs 74, 76 are generally vertically oriented in a side-by-side arrangement such that manual controls 88, 90 are positioned between driver seat 28a and passenger seat 28b and more specifically, between seatback 94 of driver seat 28a and seatback 100 of passenger seat 28b. In the longitudinal direction of off-road vehicle 10, remote auxiliary reservoirs 74, 76 are positioned at least partially between seat assembly 28 and cargo box 30. For example, remote auxiliary reservoirs 74, 76 may be positioned at least partially aft of seat assembly 28 and forward of cargo box 30. Vertically, remote auxiliary reservoirs 74, 76 are positioned at least partially above powertrain 32, above seat bottoms 96, 102 and below headrests 92, 98. In this configuration, with manual controls 88, 90 in an upward facing orientation, manual controls 88, 90 of remote auxiliary reservoirs 74, 76 are positioned within occupant space 26 such that manual controls 88, 90 are accessible by an occupant of off-road vehicle 10 enabling active adjustments to the damping function of shock absorbers 62, 64. Alternatively, in this configuration, with manual controls 88, 90 in a downward facing orientation, manual controls 88, 90 of remote auxiliary reservoirs 74, 76 are positioned within occupant space 26 such that manual controls 88, 90 are accessible by an occupant of off-road vehicle 10 enabling active adjustments to the damping function of shock absorbers 62, 64.

Even though remote auxiliary reservoirs 74, 76 have been described and depicted as being at least partially aft of seat assembly 28, it should be understood by those having ordinary skill in the art that remote auxiliary reservoirs 74, 76 could be positioned in other locations such that manual controls 88, 90 are accessible from occupant space 26. For example, in FIG. 4D, remote auxiliary reservoirs 74, 76 have a side-by-side arrangement such that manual controls 88, 90 are positioned between driver seat 28a and passenger seat 28b and more specifically, between seat bottom 96 of driver seat 28a and seat bottom 102 of passenger seat 28b. In the longitudinal direction of off-road vehicle 10, remote auxiliary reservoirs 74, 76 are positioned at least partially forward of seat assembly 28 proximate the foot space area in front of driver seat 28a and passenger seat 28b, respectively. Vertically, remote auxiliary reservoirs 74, 76 are positioned below headrests 92, 98 and seatbacks 94, 100. In this configuration, with manual controls 88, 90 in an aftward facing orientation, manual controls 88, 90 of remote auxiliary reservoirs 74, 76 are positioned within occupant space 26 such that manual controls 88, 90 are accessible by an occupant of off-road vehicle 10 enabling active adjustments to the damping function of shock absorbers 62, 64.

Alternatively, remote auxiliary reservoirs 74, 76 may be positioned entirely forward of seat assembly 28, below headrests 92, 98, below seatbacks 94, 100 and at least partially below above seat bottoms 96, 102. In this configuration, with manual controls 88, 90 in an aftward facing orientation, manual controls 88, 90 of remote auxiliary reservoirs 74, 76 are positioned within occupant space 26 such that manual controls 88, 90 are accessible by an occupant of off-road vehicle 10 enabling active adjustments to the damping function of shock absorbers 62, 64. In yet another alternative, remote auxiliary reservoirs 74, 76 may be positioned forward of steering wheel 44 with manual controls 88, 90 in an aftward facing orientation and located proximate an instrument cluster of off-road vehicle 10 such that manual controls 88, 90 are accessible by an occupant of off-road vehicle 10 enabling active adjustments to the damping function of shock absorbers 62, 64.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An off-road vehicle comprising:
   a frame assembly;
   a powertrain coupled to the frame assembly;
   a plurality of wheels at least one of which is operatively coupled to the powertrain, the plurality of wheels including first and second rear wheels;
   a rear suspension including first and second shock absorbers, the first shock absorber coupling the first rear wheel to the frame assembly, the second shock absorber coupling the second rear wheel to the frame assembly, the first shock absorber including a first locally mounted exterior fluid reservoir, the second shock absorber including a second locally mounted exterior fluid reservoir;
   a seat assembly coupled to the frame assembly; and
   first and second remote auxiliary reservoirs, the first remote auxiliary reservoir in fluid communication with the first shock absorber and having a manual control configured to adjust a damping function of the first shock absorber, the second remote auxiliary reservoir in fluid communication with the second shock absorber and having a manual control configured to adjust a damping function of the second shock absorber;
   wherein, the manual controls of the first and second remote auxiliary reservoirs are configured to be accessible by an occupant of the vehicle.

2. The off-road vehicle as recited in claim 1 wherein, the seat assembly further comprises first and second seats; and
   wherein, the manual controls of the first and second remote auxiliary reservoirs are positioned between the first and second seats.

3. The off-road vehicle as recited in claim 2 wherein, each of the first and second seats is a bucket seat.

4. The off-road vehicle as recited in claim 2 wherein, the first seat is a driver seat and the second seat is a passenger seat.

5. The off-road vehicle as recited in claim 2 wherein, each of the first and second seats includes a seat bottom, a seatback and a headrest.

6. The off-road vehicle as recited in claim 5 wherein, the manual controls of the first and second remote auxiliary reservoirs are positioned between the seat bottoms of the first and second seats.

7. The off-road vehicle as recited in claim 5 wherein, the manual controls of the first and second remote auxiliary reservoirs are positioned between the seatbacks of the first and second seats.

8. The off-road vehicle as recited in claim 5 wherein, the manual controls of the first and second remote auxiliary reservoirs are positioned between the headrests of the first and second seats.

9. The off-road vehicle as recited in claim 1 wherein, the frame assembly includes an upper rail and wherein, the first and second remote auxiliary reservoirs are coupled to the upper rail.

10. The off-road vehicle as recited in claim 1 wherein, the first and second remote auxiliary reservoirs have a side-by-side orientation.

11. The off-road vehicle as recited in claim 1 further comprising a cargo box coupled to the frame assembly aft of the seat assembly; and
    wherein, the first and second remote auxiliary reservoirs are positioned at least partially between the seat assembly and the cargo box.

12. The off-road vehicle as recited in claim 11 wherein, the first and second remote auxiliary reservoirs are positioned aft of the seat assembly.

13. The off-road vehicle as recited in claim 11 wherein, the first and second remote auxiliary reservoirs are positioned at least partially forward of the cargo box.

14. The off-road vehicle as recited in claim 11 wherein, the first and second remote auxiliary reservoirs are positioned above the powertrain.

15. The off-road vehicle as recited in claim 11 wherein, the first and second remote auxiliary reservoirs are positioned above the cargo box.

16. The off-road vehicle as recited in claim 1 wherein, the frame assembly defines an occupant space and wherein, the manual controls of the first and second remote auxiliary reservoirs are positioned proximate the occupant space.

17. The off-road vehicle as recited in claim 1 wherein, the frame assembly defines an occupant space and wherein, the manual controls of the first and second remote auxiliary reservoirs are positioned within the occupant space.

18. The off-road vehicle as recited in claim 1 wherein, the manual controls of the first and second remote auxiliary reservoirs are accessible by the occupant of the vehicle while the vehicle is moving, thereby enabling active adjustments to the damping function of the rear suspension.

19. The off-road vehicle as recited in claim 1 wherein, the off-road vehicle is a side-by-side vehicle.

20. An off-road vehicle comprising:
    a frame assembly;
    a powertrain coupled to the frame assembly;
    a plurality of wheels at least one of which is operatively coupled to the powertrain, the plurality of wheels including first and second rear wheels;

a rear suspension including first and second shock absorbers, the first shock absorber coupling the first rear wheel to the frame assembly, the second shock absorber coupling the second rear wheel to the frame assembly, the first shock absorber including a first locally mounted exterior fluid reservoir, the second shock absorber including a second locally mounted exterior fluid reservoir;

a seat assembly coupled to the frame assembly, the seat assembly having first and second seats in a side-by-side arrangement;

a cargo box coupled to the frame assembly aft of the seat assembly; and first and second remote auxiliary reservoirs, the first remote auxiliary reservoir in fluid communication with the first shock absorber and having a manual control configured to adjust a damping function of the first shock absorber, the second remote auxiliary reservoir in fluid communication with the second shock absorber and having a manual control configured to adjust a damping function of the second shock absorber;

wherein, the first and second remote auxiliary reservoirs are positioned at least partially between the seat assembly and the cargo box and wherein, the manual controls of the first and second remote auxiliary reservoirs are positioned between the first and second seats such that the manual controls of the first and second remote auxiliary reservoirs are accessible by an occupant of the vehicle, thereby enabling active adjustments to the damping function of the rear suspension.

* * * * *